March 19, 1935.  R. R. SANDERSON  1,995,043
DRILL BIT
Filed June 2, 1932  2 Sheets-Sheet 1

INVENTOR
Ray R. Sanderson
BY
Evans + hue Cy
ATTORNEYS

March 19, 1935.  R. R. SANDERSON  1,995,043
DRILL BIT
Filed June 2, 1932  2 Sheets-Sheet 2

INVENTOR
Ray R. Sanderson
BY
 Evans + McCoy
ATTORNEYS

Patented Mar. 19, 1935

1,995,043

UNITED STATES PATENT OFFICE 1,995,043

DRILL BIT

Ray R. Sanderson, Orrville, Ohio

Application June 2, 1932, Serial No. 614,866

9 Claims. (Cl. 255—63)

This invention relates to removable tips for drill bits for use in churn and percussion drilling.

Drill bits conventionally used in churn and percussion drilling are of great weight. The labor and time required for removing and replacing such bits by bits of proper character for use in the particular formation being worked in, and the expense and delay incident to resharpening drill bits in the field, discourages the changing of such drill bits before it is absolutely necessary. Furthermore, the equipment for properly dressing and tempering drill bits in the field is so limited that the best tempering and dressing is seldom achieved.

Removable drill bit tips heretofore proposed for use in churn drilling have not been satisfactory for commercial use because of the inherent weakness of the union between the bit tip and the blade, the tendency of the union between the bit tip and the blade to loosen in service, and for other reasons. So far as known, no commercially satisfactory removable drill bit tip for churn drilling has been produced heretofore, although the need for such removable drill bit tips has been fully recognized in the industry.

Many distinct advantages accrue from the use of inexpensive, properly hardened and properly shaped drill bit tips in the industry. Removable drill bit tips embodying this invention may be made from the best character of materials for the service expected of them, and the forming, sharpening and tempering of the bit tips may be carefully controlled by factory equipment so that greatly superior cutting edges for the tools are produced, the drill bit tips wear longer in service, and the ease with which such drill bit tips may be changed induces the drillers to make desirable changes in the drill bit tip for different characters of rock formation, which would otherwise not be made.

Furthermore, removable drill bit tips made in accordance with this invention are inexpensive and, for the cost of three drill bits of conventional character now used, a suitable drill bit blade and about one hundred removable bit tips may be obtained.

One of the objects of the present invention is to provide a drill bit assembly which permits quick and easy interchange of drill bit tips upon the end of a drill bit blade so that a plurality of such drill bit tips may be consecutively and interchangeably used in replacing a bit tip made dull or worn in the drilling operation or for drilling different characters of rock or ground formations.

Another object is to provide a drill bit tip of maximum hardness and durability producible at a small cost and designed to take over all of the cutting operations of the drill bit.

A further object is to provide a drill bit tip, in combination with means for rigidly securing the bit tip to the bit blade in such a manner that the blade and tip cannot be readily separated from or be deformed while in a drill hole irrespective of the angular torque to which the junction of the drill bit tip and drill blade is subjected.

Another object of the present invention is to provide a drill bit tip of hardened material removably secured to a drill bit blade and which may be quickly and easily removed from such blade for purposes of replacement.

Another object is to provide a drill bit tip of proper shape and design for the most rapid cutting rate and with a maximum length of life for each character of rock.

An additional object of the invention is to provide means for securing a removable bit tip to a bit blade that is self-tightening in service.

A further object is to provide a drill bit tip and drill bit blade assembly of sufficient hardness and toughness and of such design that there will be substantially no swaging along their plane of junction during the most severe uses.

A further object is to provide a removable bit tip and drill bit blade assembly shaped to allow sufficient clearance for the free falling of the drill bit in the drill hole.

An additional object of the invention is to provide mating faces for the bit tip and bit blade that are normal to the longitudinal axis of the bit so that the churning of the bit in service will not cause loosening of the parts or deformation of the contacting surfaces.

With the above and other objects in view, which will be readily apparent from the following detailed description, the present invention consists in certain constructions and combinations of parts which will be readily understood by those skilled in the art to which the invention appertains.

In the accompanying drawings which illustrate suitable embodiments of the present invention, Figure 1 is a view in elevation of a preferred form of drill bit tip in assembled relation with a drill bit blade;

Figure 3:
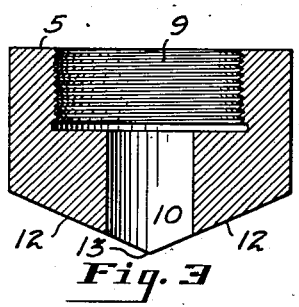
Fig. 3 is a transverse sectional view taken along line 3—3 of Fig. 2 of the bit tip.

The drill bit assembly shown in Figs. 1 to 5, inclusive, comprises a drill bit blade 1 that is rigidly secured to a drill bit tip 2 by means of an anchor stud 3. The drill bit blade 1 is preferably formed of molybdenum steel or other hard and tough material, and is provided with a flat mating face 4 of considerable area and arranged normal to the axis of the drill bit blade for engagement with a correspondingly flat mating face 5 that is formed on the drill bit tip 2.

The drill bit blade carries a pair of dowels, keys or interlocking projections 6 of any desired form, one of which is positioned on each side of a stud socket 7 that is internally threaded to receive the anchor stud 3. The upper part of the drill bit blade is shown broken away because it is of conventional form of bit blade and its showing is immaterial to a full understanding of the invention by those skilled in the art.

The drill bit tip is preferably formed of high carbon file steel.

Figure 8:
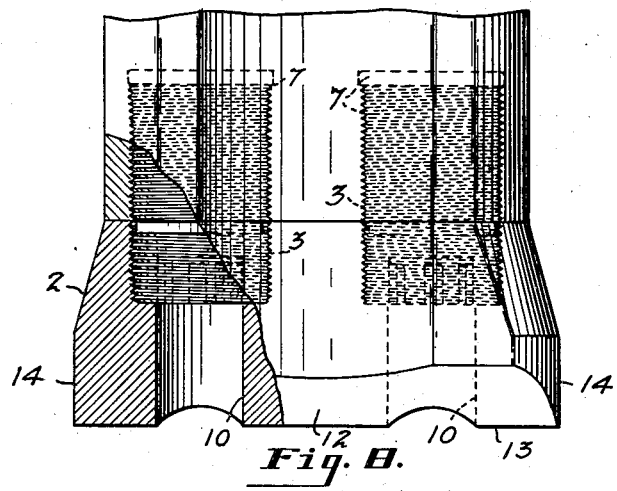
Fig. 8 is an elevational view, taken partially in section, of a modified form of drill bit tip in assembled relation with the drill bit blade.

The drill bit tip 2 has a pair of dowel or key sockets 8 for receiving the dowels or keys 6 and a suitably threaded stud receiving socket 9 for receiving the lower end of the anchor stud 3. A wrench socket 10 connects with the stud socket of the drill bit tip for receiving a suitable wrench for operating the anchor stud 3 that has a suitable splined bolt socket 11 formed in the bottom end of the stud as shown in Fig. 8.

The bottom faces 12, of equal angularity, form the cutting edge 13 of the drill bit tip. This angularity should be relatively small for rapid drilling through soft material, or relatively large angularity for use in hard rock to insure longer wear. This angularity depends upon the type of material in which the drill is to be used as well understood by those skilled in the art.

The longitudinal end portions 14 extending laterally beyond the side edges of the drill bit blade in order to provide suitable clearance between the sides of the bit blade and the sides of the bit tip, and these end portions are strongly supported by the material of the drill bit tip in order that they may retain their cutting efficiency and avoid the formation of a pinched hole or hole of decreased diameter in which subsequent bits are apt to become stuck.

The flattened side portions of the drill bit blade and of the drill bit tip provide an external water course and ample space between the assembled bit and the drill hole for the free falling of the tool thru water which commonly seeps into a drill hole of any appreciable depth and thru the rock particles broken away by the drill bit tip between bailing operations.

The anchor stud is preferably formed with a No. 16 right hand thread A. S. M. E. Standard over the upper two thirds of its length for securing the stud within the correspondingly threaded socket 7 of the bit blade, whereas the lower one third portion of the stud has a left hand thread, preferably of the same number, for engaging the correspondingly threaded socket 9 of the bit tip. The threaded portion of the stud for engaging in the bit blade socket 7 is made twice the length of the threaded portion for engaging the bit tip in order to protect the threads of the bit blade. Since the bit tips are replaced, it is not so essential to protect the threads in the socket of the bit tip. It has been found by test that this character of anchor stud tightens itself in service and it is believed that the resilient, yielding of the metal of the blade and of the tip adjacent the stud socket transmits wedging action to the threads of the stud that causes tightening of the stud in service.

It will be apparent from the above description that the drill bit may readily and easily be assembled in the field by the use of a suitable splined wrench for removing and inserting the securing stud 3 in place. In mounting the drill bit tip in place, the securing stud is threaded half of its blade-socket-engaging distance into the drill bit blade. The drill bit tip is then placed against the lower end of the securing stud and the stud is turned by means of a suitable wrench for engaging the splined socket of the stud. The dowels or keys 6 are placed in proper registration with the dowel-receiving sockets 8 of the bit tip and the stud is screwed up tightly to bring the mating faces 4 and 5 of the bit blade and the bit tip rigidly against each other.

In removing a bit tip from the bit blade, the crushed rock and/or other material that collects within the wrench socket 10 of the tip is first removed. The securing stud 3 is then loosened, which releases the bit tip and permits the replacement of the bit tip with a new bit tip.

It will be noted that there are no laterally extending parts or assembly parts that can in any way become battered by the operation of the drill, and that the mating faces 4 and 5 of the drill bit blade and the drill bit tip are formed at right angles to the longitudinal axis of the bit, so that the impact of the drill tools on the bit tip when the tool is dropped is transmitted over considerable area to the drill bit tip. The dowels, or keys, are positioned on each side of the securing stud 3, so that all lateral torque which is imposed on the bit tip in the heavy service to which it is subjected is received on these dowels or keys, or other form of interfitting surface, which prevents any tendency of the bit tip to release itself from the bit blade.

In the drilling of inclined formations, particularly where the dip of the strata passes from a soft to a hard formation, the lateral strains on the bit tip in churn drilling are very great, and therefore these dowels or keys are so placed in the bit assembly herein disclosed as to accurately and rigidly hold the bit tip against all stresses that are imposed upon it. It will therefore be seen that the bit tip forming a part of the present invention is of ample strength to readily withstand the rigorous and heavy service which it is required to perform, and also that it is sufficiently small and light that several new bit tips may be carried conveniently, for replacing bit tips worn or broken in service or for changing bit tips for use in different characters of rock.

It will also be appreciated that, with a bit tip of the simplified mechanical design of that proposed herein, the bit tips may be made of a very high quality of steel and at relatively inexpensive cost, and may be accurately shaped and tempered in accordance with the best factory practice. With drill bits of conventional design it is very difficult to use this grade and character of steel because of the difficulty of dressing the tools in the field and also because of the difficulty of obtaining the proper tempering and hardening of the bit tip in service. In factory manufacture of the replacable bit tips of the character herein disclosed, the bit tips may be tempered under the accurately controlled conditions that prevail in the factory and that are unobtainable in field service.

It will also be appreciated that the ease with which the bit tips of the character herein proposed may be changed induces drillers to make the desired changes of bit tips for drilling different rock formations, rather than proceeding with a bit tip that is not properly formed for use in the particular character of strata being worked in. The simplified removal and replacement of the bit tip also induces the driller to discard worn bit tips before they are so dull as to be ineffective in drilling operations. The weight, expense and labor incident to re-dressing a drill of the character now conventionally used in churn drilling renders the workmen reluctant to redress or replace such drill bits until it is absolutely necessary, with the result that many times crooked holes and wedged tools result from the failure of the driller to change his tools when such changes should be made.

The general shape of the assembled bit blade and the bit tip, and the absence of projections, openings and the like in the sides of the bit tool greatly facilitate the operation in the drill hole of the assembled bit structure herein disclosed.

Figure 6:
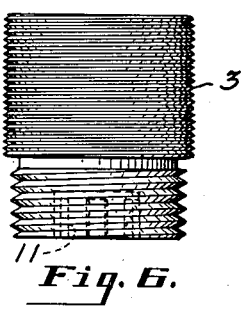
Fig. 6 is an elevational view of a modified form of anchor stud.
Figure 7:
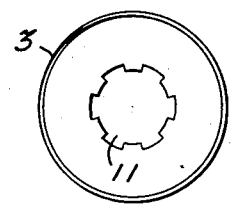
Fig. 7 is a bottom plan view of a stud such as shown in Fig. 5 or Fig. 6.

Fig. 6 of the accompanying drawings shows a modified form of stud that can be used for anchoring the drill bit tip to the drill bit blade if desired. In this particular form of anchor stud a differential thread of twice the pitch of the thread that enters the drill bit blade is used for securing the stud to the drill bit tip. Both threads on this particular form of bolt are preferably right-hand threads and the stud end that enters the drill bit blade is made of greater diameter than the stud end that enters the drill bit tip, so that the anchor stud may be screwed into the drill bit blade one-half the length of the threaded portion of the stud that enters the drill bit tip. In mounting a bit tip in place, the stud is screwed into the bit blade until only one-half of the tip securing portion is exposed. The tip is then mounted in place and the stud is withdrawn from the blade and screwed into the tip. Since the thread of the tip-securing portion of the stud travels into the drill bit tip at twice the rate that the stud leaves the bit blade, this results in a secure binding together of the drill bit blade and drill bit tip as the stud is tightened.

Figure 9:
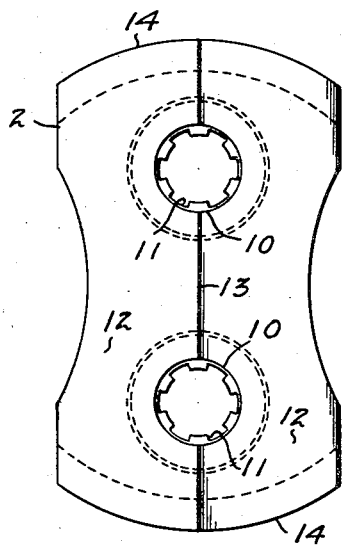
Fig. 9 is a bottom plan view of the assembly shown in Fig. 8.

A modified form of drill bit blade and tip with enlarged water course is shown in Figures 8 and 9. In this construction of drill bit a pair of securing studs are used in lieu of the single securing stud and interfitting projections used in connection with the type of drill bit blade shown in Fig. 1. Otherwise, the parts of this assembled drill bit blade and tip are the same as those shown and described in connection with the drill bit blade and tip assembly of Fig. 1.

Figure 10:
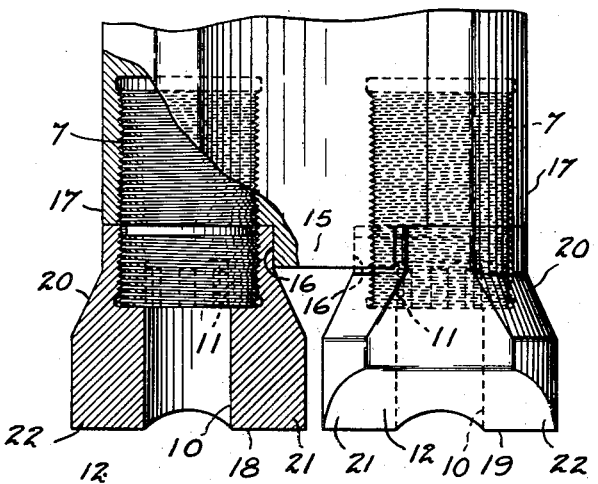
Fig. 10 is a side elevational view, shown partially in section, of another modified form of bit tip and bit blade embodying the invention.
Figure 11:
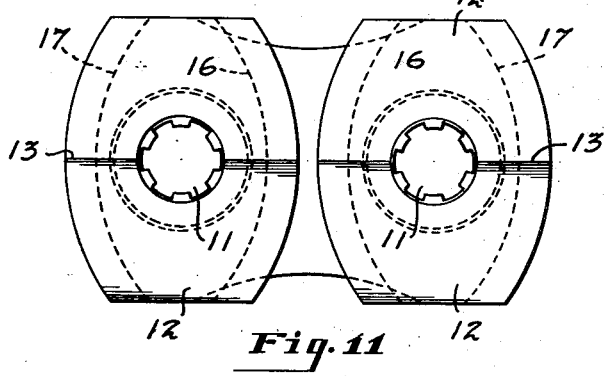
Fig. 11 is a bottom plan view of the drill bit assembly shown in Fig. 10.

Fig. 10 of the drawings shows a further modification of a drill bit blade and tip assembly wherein a pair of removable bit tips are carried to the drill bit blade. In this construction the drill bit blade has a lug 15 formed thereon, with side faces 16 preferably of the same radius of curvature as the outer face 17 of the blade. The stud sockets 7 of the drill bit blade have their axes positioned midway between the center of the corresponding faces 16 and 17. The drill bit tips 18 and 19 that are used in this assembly each has a lateral shoulder 20 at its base that is of the same radius of curvature as the faces 16 and 17 of the drill bit blade, so that each of the drill bit tips 18 and 19 may be reversed 180° from its position shown in the drawings. Otherwise, each of these drill bit tips is the same as the drill bit tip shown and described in connection with Fig. 1. It will be seen that the face 16 engages with the base shoulder 20 of the drill bit tips when the drill bit tips are mounted in position on the drill bit blade, and that, since this face 16 is eccentric with respect to the axis of the securing stud, the drill bit tip will be prevented from turning in service.

It will be readily appreciated by those skilled in the art that the inner cutting bit corners 21 of the drill bit tips 18 and 19 are positioned at the central portion of the bit assembly, and that, therefore, these corners will receive relatively little wear, whereas the bit corners 22 that are disposed at the outside shoulders of the drill bit assembly receive the greatest wear of any portion of the cutting face of the bit, and therefore the drill bit corners 22 will be worn and broken down much before the drill bit corners 21. It will, therefore, be seen that by the reversal of the drill bit tips 18 and 19 through 180° from their illustrated position so that the substantially unworn cutting corners 21 are placed in the position of the worn cutting corners 22, substantially twice the life may be obtained from the bits there shown.

Field tests of particularly rigorous nature have been made on drill bits of the character herein disclosed and it has been found that such bit tips are not loosened from the bit blade in service although the connection of the bit tip to the bit blade is relatively simple mechanically. It has also been found in actual service in the field tests made on drills embodying the invention, that the life of the drill greatly exceeds the life of drills that are dressed in the field and also greatly exceeds the life of the best form of single-piece drill that has heretofore been obtainable commercially. It has also been found in these tests that a locking stud of the character shown in Fig. 5 of the drawings is self-tightening in service.

The severe service that is imposed on a churn or percussion drill by reason of the great weight of the tool assembly and the battering of the tool in the drilling operation introduces many problems in connection with drills for such service that are not presented at all in other types of drilling tools, and these problems have been met successfully in drill bits embodying the inventions herein disclosed.

Figure 1:
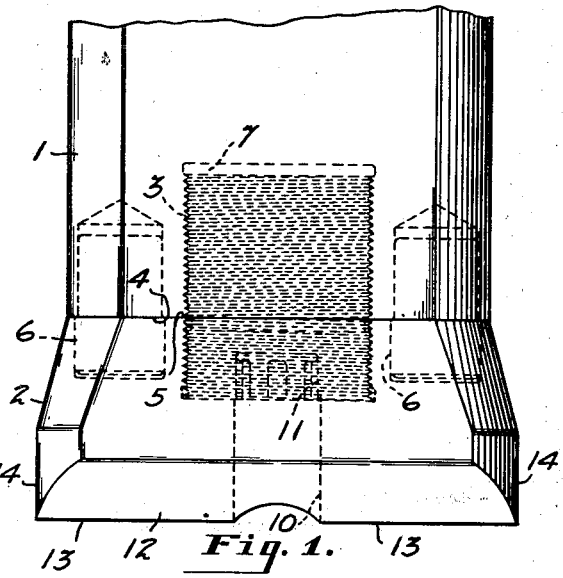
Figure 2:
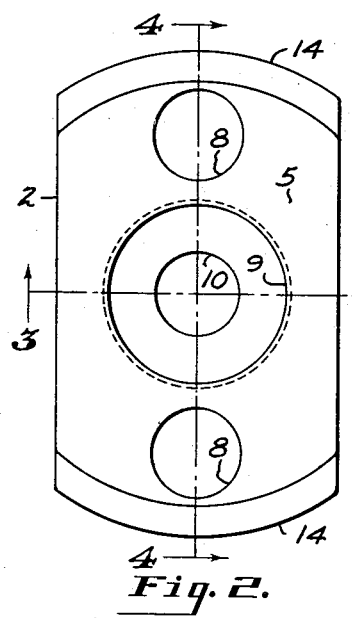
Fig. 2 is a top plan view of the drill bit tip.
Figure 4:
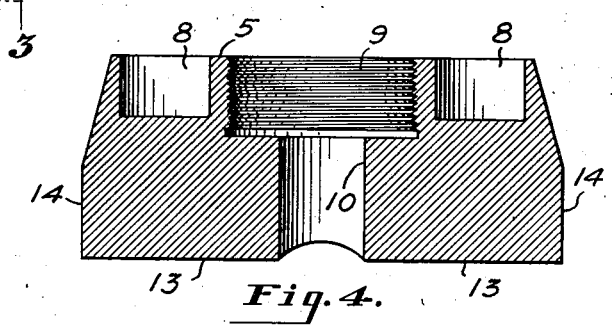
Fig. 4 is a sectional view taken longitudinally of the bit tip along the line 4—4 of Fig. 2.
Figure 5:
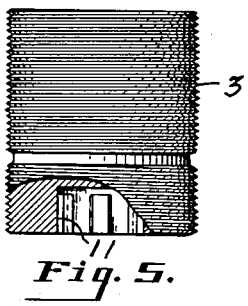
Fig. 5 is an elevational view of a preferred form of securing stud for anchoring the bit tip to the bit blade.

It is to be understood that the particular embodiments of the invention shown and described are presented for purposes of illustration of the invention, and that various other modifications, including the character of dowel or key for taking the torque in connection with the drill bit assembly shown in Fig. 1 and in the character of cutting face, and in other particulars may be made without departing from the invention as defined in the appended claims.

What I claim is:

1. A drill bit for churn or percussion drilling, comprising a bit blade having an internally threaded stud-receiving socket, a bit tip having an internally threaded stud-receiving socket, said bit blade and bit tip each having an impact surface surrounding said sockets and arranged normal to the axes of said sockets, a threaded stud adapted for making threaded engagement with both said stud-receiving socket formed in the bit blade and said stud-receiving socket formed in the bit tip and adapted for binding said bit blade and bit tip together, the portions of the stud screwing into the bit blade socket and the bit tip socket having threads of opposite hand, and lug means carried by the bit blade on each side of said socket and interfitting with parts of said bit tip for preventing relative rotary movement of said bit tip and bit blade when in assembled relation.

2. A drill bit for churn or percussion drilling, comprising a bit blade having an internally threaded stud-receiving socket formed in the end thereof, an impact transmitting face normal to the bit blade formed adjacent the mouth of said stud-receiving socket, a bit tip having an internally threaded stud-receiving socket formed therein and an impact-receiving face surrounding said socket and designed to engage the impact transmitting face of said bit blade and arranged normal to the longitudinal axis of said bit blade, said bit tip also having a cutting face formed thereon, an anchor stud having a threaded portion designed to be received in the socket of said bit blade and a second threaded portion designed to be received in the socket of said bit tip of substantially one-half the length of the portion received in the socket of the bit blade, the portion of said stud received in the socket of said bit tip being provided with wrench-engaging means, said bit tip having a wrench-receiving aperture opening into the stud-receiving socket from the cutting face of said bit tip, and a pair of keys, one of which is positioned on each side of said sockets for preventing relative rotary movement between said bit tip and said bit blade when in assembled relation.

3. A drill bit for churn or percussion drilling, comprising a bit blade having a pair of internally threaded stud-receiving sockets extending longitudinally therein from the lower end, a bit tip having a pair of similarly positioned stud-receiving sockets, an impact transmitting face formed on said bit blade, an impact-receiving surface formed on said bit tip and designed to register with said impact transmitting surface of said blade, said bit tip also having a cutting face formed thereon, and a pair of threaded studs arranged for threaded engagement in said sockets for binding said impact transmitting and impact receiving faces together, each of said studs having wrench-engaging means formed at the lower end thereof, and said bit tip having a pair of wrench-receiving apertures formed through the cutting face thereof for access to the wrench-engaging means of said studs.

4. A bit for churn or percussion drilling, comprising a bit blade having a pair of impact transmitting faces positioned at the lower end thereof, an internally threaded lug-receiving socket disposed centrally of each impact transmitting face and extending longitudinally from said face into said blade, a lug interposed between said faces and having a bit tip-engaging face formed by each side thereof, a pair of removable bit tips each having a cutting face on one side and an impact-receiving face on the opposite side designed to engage the impact transmitting face of said blade and a shouldered portion immediately adjacent said impact face designed to engage the corresponding face of said lug formed on said blade, a correspondingly formed face on the opposite side of said tip, each of said tips also having an internally threaded stud-receiving socket formed in said tip centrally between said shouldered portions and arranged to register with the corresponding stud-receiving socket of said blade, and a wrench-receiving aperture extending through the cutting edge of said tip and into the stud-receiving socket of said tip, and a stud for binding each of said tips to said blade by engagement with the internally threaded sockets therein, each of said studs having wrench-engaging means formed in one end thereof.

5. A drill bit for churn or percussion drilling, comprising a drill bit blade having a stud receiving socket internally threaded in one direction, a drill bit tip having a stud receiving socket threaded in the opposite direction, said drill bit blade and said drill bit tip having mating surfaces surrounding said sockets arranged normal to the axis of said sockets, a threaded stud adapted for making threaded engagement with both said stud receiving socket in the bit blade and said stud receiving socket in the bit tip and adapted for securing said drill bit blade and drill bit tip together, the end portions thereof being threaded in opposite directions, and means offset from said sockets and interfitting with both the blade and tip for preventing relative turning movement of said bit blade and bit tip when in assembled relation, whereby said bit tip is maintained in secure position on said bit blade.

6. A drill bit for churn and percussion drilling comprising a drill bit blade having an internally threaded stud receiving socket formed therein, an impact face substantially normal to the longitudinal axis of said drill bit blade and forming the lower extremity thereof, said blade being of elongated cross-sectional form adjacent its lower end, a drill bit tip having an internally threaded stud receiving socket formed therein and registering with the stud receiving socket formed in said drill bit blade, an impact face contacting the impact face formed on said drill bit blade, the upper portion of said bit tip being of the same size and shape as the lower end of the bit blade, an externally threaded stud for positioning within the registering sockets formed in said drill bit blade and said drill bit tip, a wrench socket formed inwardly of one end of said stud, a wrench receiving aperture formed through said drill bit tip and opening into the stud receiving socket formed in said drill bit tip, and means for holding the bit tip in registry with the bit blade.

7. A drill bit comprising, a bit blade having an internally threaded stud receiving socket, a bit tip having an internally threaded stud receiving socket adapted for registration with said stud receiving socket formed in said bit blade, the threads of the registering sockets being of opposite hand, an externally threaded stud having threaded portions of opposite hand for securing said bit blade and said bit tip together and having a wrench engaging aperture formed inwardly of one end thereof, an impact transmitting face formed on said bit blade and normal to the longitudinal axis thereof, an impact receiving face formed on said bit tip, and means extending across the contacting impact faces of both said bit blade and said bit tip and laterally offset from said sockets for substantially preventing rotary movement of said bit tip relative to said bit blade.

8. A drill bit for churn or percussion drilling comprising a bit blade having an impact face at its lower end normal to its axis and an internally threaded socket opening only to said impact face inwardly of its margin, a bit tip having an impact face adapted to seat upon the impact face of said blade and a bottom cutting face, said bit tip having an internally threaded socket adapted to register with the socket of the blade, and a wrench receiving aperture from the bottom of its socket to the bottom face, and an anchor stud having a portion threaded to screw into the bit blade socket and a second portion at its lower end threaded in the opposite direction and adapted to screw into the socket of the bit tip, the threaded portion of the anchor stud adapted to screw into the bit tip being substantially one-half the length of the portion adapted to screw ino the bit blade, the lower end of said stud being formed to receive a wrench inserted through said wrench aperture.

9. A drill bit for churn or percussion drilling comprising a bit blade having an impact face at its lower end normal to its axis and an internally threaded socket opening only to said impact face inwardly of its margin, a bit tip having an impact face adapted to seat upon the impact face of said blade and a bottom cutting face, said bit tip having an internally threaded socket adapted to register with the socket of the blade, and a wrench receiving aperture from the bottom of its socket to the bottom face, and an anchor stud having a portion threaded to screw into the bit blade socket and a second portion at its lower end threaded in the opposite direction and adapted to screw into the socket of the bit tip, the lower end of said stud being formed to receive a wrench inserted through said wrench aperture, and means independent of the stud for holding the bit tip against turning movements with respect to the bit blade and for guiding the bit tip axially of the blade whereby the bit tip may be positively moved toward or away from the impact face of the blade by rotation of the anchor stud.

RAY R. SANDERSON.